July 24, 1962  B. E. A. H. BEESKOW  3,045,789
CLUTCH ACTUATING AND CONTROL ARRANGEMENT
Filed Feb. 24, 1958
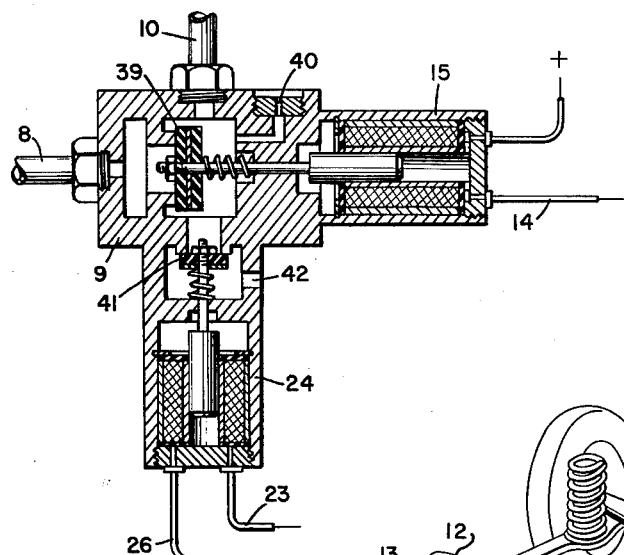
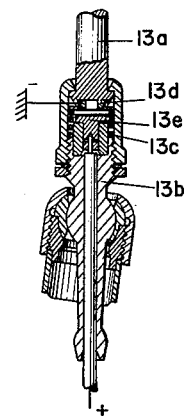
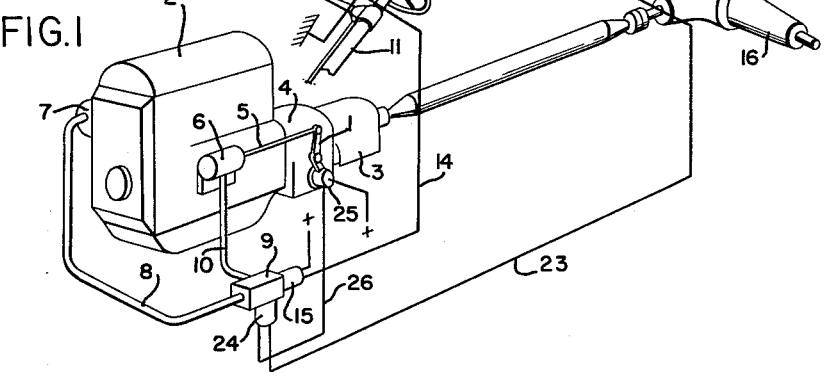
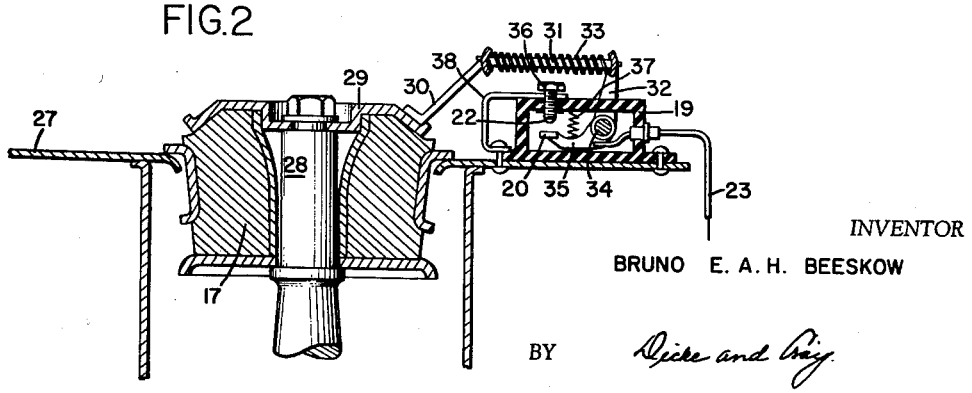
INVENTOR
BRUNO E. A. H. BEESKOW
BY *Dicke and Craig*
ATTORNEYS United States Patent Office 3,045,789
Patented July 24, 1962

3,045,789
CLUTCH ACTUATING AND CONTROL
ARRANGEMENT
Bruno E. A. H. Beeskow, Stuttgart-Bad Cannstatt, Germany, assignor to Daimler-Benz Aktiengesellschaft, Stuttgart-Unterturkheim, Germany
Filed Feb. 24, 1958, Ser. No. 716,985
Claims priority, application Germany Feb. 28, 1957
12 Claims. (Cl. 192—3.5)

The present invention relates to an arrangement for controlling the engagement of a clutch in a motor vehicle, the clutch of which is automatically actuated, for example, by a servo motor responsive to the vacuum in the intake manifold of the engine or by a servo motor driven by an additional vacuum pump, in dependence on the position of an electromagnetic shifting valve member which in turn is controlled by an electrical contact or switch actuated during shifting of the change-speed transmission having a plurality of transmission ratios or speeds selectively engageable in a step-like manner, whereby access for the atmospheric air to the servo motor is provided after the shifting operation is completed to re-engage the previously disengaged clutch.

The present invention aims at a control of the clutch engagement which is far-reachingly independent from the shifting of the transmission ratios or speeds, which takes into consideration and fulfills all practical requirements and needs of a motor vehicle during operation thereof, and which consists essentially in that an arrangement is provided which senses or is responsive to the reaction moment of a part of the motor vehicle, for example, of the engine-transmission block, the rear axle or the like, during thrust or pull with respect to the support or bearing thereof at the vehicle, and which exclusively or additionally to the shifting valve member controls with a further control valve member the access or admission of atmospheric air to the servo motor in such a manner that a more rapid and therewith a harder clutch engagement takes place if the arrangement responds to the reaction moment occurring during pull or thrust.

In accordance with a further feature of the present invention, the device sensing the reaction moment may consist, in connection with an installation with a shifting valve member which, after shifting, controls the access of a quantity of atmospheric air to the servo motor necessary for relatively slow and soft engagement of the clutch, of a switch which controls electrically an electromagnetic control valve member for the admission of an additional quantity of air to the servo motor.

A switch controlled preferably by the clutch linkage may be provided which supplies current to the switch or contact sensing the reaction moment or to the electromagnetic control valve only during a time interval from the disengagement of the clutch to the re-engagement thereof.

Furthermore, it may be advantageous in a construction according to the present invention to arrange the sensing device or switch which senses the reaction moment at the elastically constructed suspension of the rear axle, of the engine or of the joint shaft at the vehicle frame.

Accordingly, it is an object of the present invention to provide a clutch control arrangement which controls the reengagement of the clutch in a manner to fulfill and correspond to the particular requirements of the vehicle at that particular time.

Another object of the present invention is the provision of a control arrangement for the re-engagement of an automatically actuated clutch, disengaged during initiation of the shifting operation of the transmission in which the speed of rate of re-engagement is determined in response to the driving conditions of the vehicle.

Still another object of the present invention is the provision of means for controlling the re-engagement of an automatically actuated clutch which accelerates the re-engagement under certain operating conditions.

These and other objects, features and advantages of the present invention will become more obvious from the following description when taken in connection with the accompanying drawings, which show, for purposes of illustration only, in the figures thereof an arrangement of the clutch actuating control installation in accordance with the preferred embodiment of the present invention.

FIGURE 1 shows a perspective schematic arrangement of the clutch-actuating installation in accordance with the present invention.

FIGURE 2 shows a cross-sectional view of the reaction moment-responsive switch of FIGURE 1.

FIGURE 3 shows a cross-sectional view of the control device of FIGURE 1.

FIGURE 4 shows a cross-sectional view of the switch containing in the gear shifting means of FIGURE 1.

Referring now to FIGURE 1, reference numeral 1 designates therein the clutch lever for the clutch 4 arranged between the engine 2 and the change-speed transmission 3. The clutch lever 1 is connected with the servo motor 6 by a rod or linkage 5. The servo motor 6 responds to the vacuum which exists or prevails in the intake manifold 7 of the engine during the operation thereof and which is rendered to be effective over the line 8, the control device 9 and the line 10 on the servo motor 6.

Of course, a source of vacuum, such as a separate vacuum pump, may be used for driving the servo motor means in place of the intake manifold. The driver's control of the admission or of the access of the vacuum from intake manifold 7 thereby takes place electrically and automatically by means of the shifting lever 13 arranged at the steering column 11 for the steering wheel 12 which is provided for that purpose with any suitable switch, as illustrated in FIGURE 4, for example, in the support or base thereof so that upon movement of the shifting lever 13 the electromagnetic shifting valve member 15 in the control device 9 is energized over the line 14 and therewith connects the line 8 with the line 10 so that the vacuum prevailing in the intake manifold 7 becomes effective to actuate a servo motor 6. It is understood that the shifting valve 15 and control device 9 may thereby be of any suitable conventional construction, which are not shown in detail herein since they do not form any part of the present invention and may be of prior art design.

The shifting lever 13 of FIGURE 1 includes, as shown in FIGURE 4, a gear shift lever 13a which is movably supported against spring 13c in part 13b. When the lever 13a is moved to such an extent that contact 13d is connected with the negative terminal of the battery through contact 13c, the electromagnetically controlled shifting valve 15 (FIGURE 1) is actuated.

As soon as a new transmission speed or ratio is engaged in the transmission 3 upon initiation of and by means of the shifting lever 13, the shifting valve member 15 again is actuated automatically in any suitable manner so as to block the line 8 against the line 10 and to connect the line 10 with the atmosphere over a cross section which results in a relatively slow release of the servo motor 6 and therewith produces a soft engagement of the clutch 4.

Since a soft engagement of the clutch 4 is not at all desirable during all clutching engagements, especially when the vehicle is accelerated, an electric switch 19 is provided which is schematically indicated in FIGURE 1 and which senses the reaction moment of the rear axle 16 at the elastic suspension 17 of the rear axle gear housing 18. The movable contact member 20 of the switch 19 undergoes during pull or acceleration a movement in the direction of the arrow 21 and thereby makes contact with the relatively stationary contact member 22. As a result of the electrical contact between the movable contact member 20 with the relatively stationary contact member 22 the electromagnetic control valve member 24 in control device 9 is energized over line 23 which upon energization opens up a relatively large cross section for the admission of atmospheric air through the line 10 to the servo motor 11. The servo effect of the servo motor 6 caused previously by the presence of the vacuum existing in intake manifold 7 thereby is rapidly released and the engagement of the clutch 4 takes place relatively rapidly.

FIGURE 2 illustrates in detail the construction of the switch 19 and the elastic suspension 17 connected to the rear axle gear housing 18. As illustrated in FIGURE 2, a bolt 28, which is rigidly connected to the gear housing 18, is resiliently mounted on the car body member 27 by means of metal-rubber suspension 17. A cover plate 29 is provided for the suspension 17, which cover plate is connected to lever 32 of switch 19 by means of member 30 and a rod 31. The rod 31 is maintained between members 30 and 32 by means of a spring 33. Lever 32 pivots the shaft 34 which has rigidly connected thereto a lever 35 which lever carries contact 20 of line 23. When the motor pulls, lever 32 together with the shaft 34 is rotated clockwise against spring 37 so that contact 20 on the lever 35, which is rigidly connected to shaft 34, comes into contact with the adjustable contact screw 36 of contact 22. This contact between the two electrical contacts 20 and 22 closes switch 19 to open valve 24 and provide a relatively rapid engagement of clutch 4 by the admission of air through valve 24.

In order that the switch 19 is able to perform its control function only if the clutch 4 is actuated, i.e., in order that current can flow upon closure of the contact members 20 and 22 only after the clutch has previously been disengaged by actuation of the shifting lever 13, a switch 25 is provided at the clutch lever 1 and is operatively connected therewith in such a manner that the current circuit from the battery through the electric line 26 to the control valve member 24 and to the switch 19 is only closed if the clutch lever 1 has been moved from the position thereof corresponding to the normal rest position, i.e., is in the position in which the clutch is disengaged.

Control valve 9, which controls the supply of vacuum and atmospheric air for the servo motor 6 and includes valves 15 and 24, is illustrated in detail in FIGURE 3. As illustrated, valve 15 includes a valve plate 39 controlled by coil means included in the circuit comprising line 14 and the switch actuated by the shifting lever 13. Valve 24 includes a valve plate 41 controlled by the circuit including lines 23 and 26, which is energized by switch 19. Passage 8 connected with a vacuum source 7 is closed off from passage 10 by the valve plate 39 when valve member 15 is not energized. By means of the constant vent opening 40, venting of the servo motor 6 takes place through passage 10 in such a way that the clutch engages relatively slowly. In order to obtain a higher rate of venting of the servo motor 6 during the time the vehicle is pulled, and in order for the clutch to engage quicker, the control valve 24 is energized through switch 19 as described above. The valve plate 41 of control valve 24 thereby opens so that additional atmospheric air may be fed to the servo motor 6 through the opening 42 and pipe 10, to thereby provide a relatively rapid engagement of the clutch. During pushing of the vehicle, switch 19 does not respond and venting takes place only through the opening 40. It should also be mentioned that when the shifting valve 15 is in the open position, the valve plate 39 thereof blocks the vent bore 40. In the manner described above, the clutch of the present vehicle first engages slowly and such slow rate of engagement is maintained until the clutch becomes sufficiently engaged to transmit sufficient torque to actuate the reaction member. This torque is transmitted to the electric switch 19 which thereupon allows a relatively rapid engagement of the clutch.

While I have shown and described one embodiment in accordance with the present invention, it is understood that the same is not limited thereto but is susceptible of many changes and modifications within the spirit and scope of the present invention, and I therefore intend to cover all such changes and modifications as encompassed by the appended claims.

I claim:

1. An arrangement for automatically controlling the re-engagement of a clutch in a motor vehicle having a transmission and shifting means therefor, comprising a pressure-responsive servo motor means operatively connected to said clutch for controlling the disengagement and engagement of said clutch, and control means operatively connected to said motor means to control energization thereof including first means so constructed and arranged as to control disengagement of said clutch by said motor means and to allow a relatively slow re-engagement of said clutch, means including the shifting means for said transmission of the vehicle for actuating said first means, second means so constructed and arranged as to provide a relatively rapid re-engagement of said clutch, and means responsive to a reaction moment on a part of the vehicle for actuating said second means when said part experiences a reaction moment.

2. An arrangement according to claim 1, wherein said motor vehicle includes an internal combustion engine having an intake manifold, and wherein said servo motor means is driven by the vacuum in the intake manifold of the internal combustion engine.

3. An arrangement according to claim 1, wherein said first means includes an electromagnetic shifting valve.

4. An arrangement according to claim 3, wherein said shifting means includes a switch for closing a circuit to energize said electromagnetic valve upon initiation of the shifting operation and therewith to disengage said clutch.

5. An arrangement according to claim 1, wherein said vehicle includes a rear axle means and wherein said part of the vehicle is the rear axle means thereof.

6. An arrangement for automatically controlling the re-engagement of a clutch in a motor vehicle with a transmission and shifting means therefor, comprising a source of low pressure, a vacuum driven servo motor means operatively connected to said source of low pressure and to the atmosphere for controlling the disengagement and engagement of said clutch, control means for controlling the operation of said motor means including first means for controlling the supply of vacuum to said motor means to disengage said clutch and for normally controlling the supply of atmospheric air to allow a relatively slow re-engagement of said clutch, means including said shifting means for the transmission of said vehicle for actuating said first means, second means for controlling the supply of additional atmospheric air to said motor means to thereby provide a relatively rapid re-engagement of said clutch, and means responsive to a reaction moment of a part of the vehicle for actuating said second means when said part of the vehicle experiences a reaction moment.

7. An arrangement according to claim 6, wherein said second means includes an electromagnetic control valve for controlling the admission of atmospheric air to said servo motor means and wherein said means responsive to the reaction moment includes a switch closing a circuit for energizing said electromagnetic control valve.

8. An arrangement according to claim 7, further comprising switch means operatively connected to said clutch for supplying current to said circuit only during the period of time between the disengagement of said clutch to the engagement thereof.

9. An arrangement according to claim 1, wherein said part is a power transmission part elastically suspended on the vehicle, and wherein said means responsive to the reaction moment is arranged at the elastic suspension of said part at the vehicle frame.

10. An arrangement for automatically controlling the re-engagement of a clutch in a motor vehicle having a transmission and shifting means therefor, comprising a source of low pressure, a vacuum-driven servo motor means operatively connected to said source of low pressure and to the atmosphere for controlling the disengagement and engagement of said clutch, control means for controlling the operation of said motor means including first electromagnetic shifting valve means for controlling the supply of vaccum to said motor means to disengage said clutch and for normally controlling the supply of atmospheric air to said motor means to allow a relatively slow re-engagement of said clutch, circuit means including a switch operable by said shifting means for the transmission of said vehicle for actuating said first valve means, second electromagnetic shifting valve means for controlling the supply of additional atmospheric air to said motor means to thereby provide a relatively rapid re-engagement of said clutch, and second circuit means for actuating said second valve means including a switch operable by means responsive to a reaction moment on a part of the vehicle for actuating said second means when said part of the vehicle experiences a reaction moment.

11. An arrangement as defined in claim 10, including a valve housing, said first and second valve means being arranged within said housing, first conduit means connecting said source of low pressure to said housing, second conduit means connecting said housing with said servo motor means, relatively small vent means in said housing connecting the housing with the atmosphere, said first valve means being so constructed and arranged as to selectively open one of said first conduit means and said relatively small vent means, and relatively large vent means in said housing, said second valve means being so constructed and arranged as to selectively open and close said relatively large vent means.

12. An arrangement according to claim 11, further comprising switch means operatively connected to said clutch for supplying current to said second circuit means for actuating said second valve means only during the period of time between the disengagement of said clutch and the engagement thereof.

References Cited in the file of this patent

UNITED STATES PATENTS

| | | |
|---|---|---|
| 2,136,800 | McCollum | Nov. 15, 1938 |
| 2,225,315 | McCollum | Dec. 17, 1940 |
| 2,237,264 | Price | Apr. 1, 1941 |
| 2,763,347 | Haubourdin et al. | Sept. 18, 1956 |

FOREIGN PATENTS

| | | |
|---|---|---|
| 403,817 | Great Britain | Jan. 4, 1934 |
| 432,802 | Great Britain | Aug. 2, 1935 |